May 24, 1960  WEN MOU CHOW ET AL  2,938,055
HEAT RECOVERY SYSTEM FOR DIPHENYLAMINE PROCESS
Filed Sept. 18, 1956
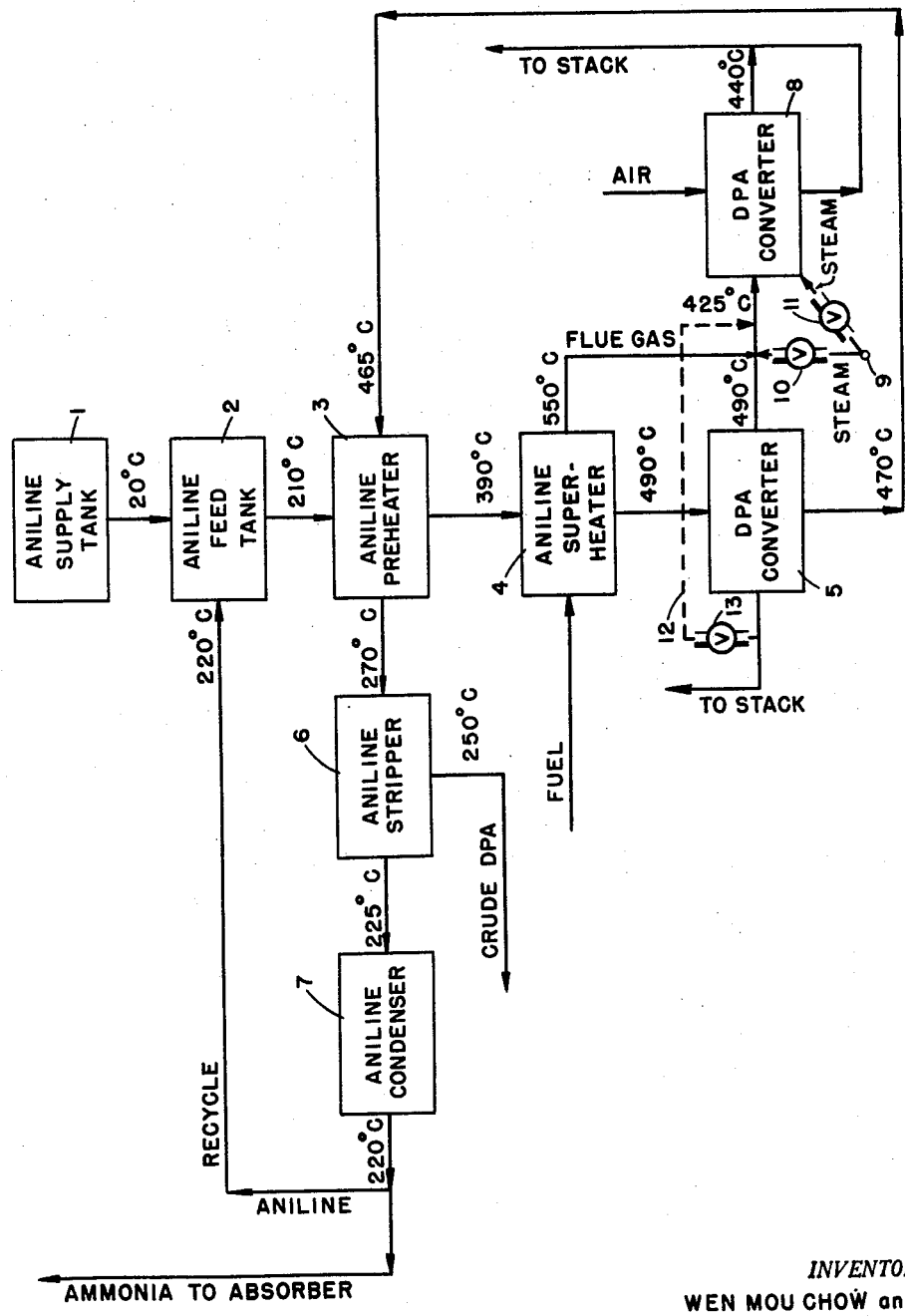
INVENTOR.
WEN MOU CHOW and
BY ALFRED O. PARKER
ATTORNEY 2,938,055

HEAT RECOVERY SYSTEM FOR DIPHENYLAMINE PROCESS

Wen Mou Chow, Princeton, and Alfred O. Parker, Bound Brook, N.J., assignors to American Cyanamid Company, New York, N.Y., a corporation of Maine Filed Sept. 18, 1956, Ser. No. 610,561

4 Claims. (Cl. 260—576)

This invention relates to an improved process for the vapor phase production of diphenylamine, which will be referred to in the remainder of the specification and drawing by its industrial abbreviation, DPA.

Diphenylamine can be produced by the vapor phase catalytic deamination of aniline. This is shown for example in U.S. Patent 2,098,039. Therein aniline vapor, at about atmospheric pressure, is passed over an aluminum or titanium oxide catalyst at above 400° C., to obtain diphenylamine. The reaction requires a supply of heat to the converter, which is ordinarily a converter of the tubular type with the catalyst in the tubes and provided with a flow of cooling or heating gases in a sinuous path over them.

In the process heat has to be introduced at three points. First, the aniline has to be preheated before being fed to the converter; second, the catalysts in the converter must also be heated; and third, heat is required to separate the components of the converter product by distillation. This latter requirement is quite large because the process is a continuous one in which only a relatively small amount of aniline is transformed into diphenylamine in a single pass through the converter. It is necessary, therefore, to separate out the unreacted aniline and the ammonia produced in the reaction from the diphenylamine produced. The system, while perfectly operable, leaves much to be desired from the standpoint of economics. The introduction of heat at three different points is very wasteful, and there are heat losses in conjunction with each operation so that the total fuel requirements are quite high.

According to the present invention a novel arrangement of steps and equipment is used so that all of the heat required is introduced at one point with resulting great simplification and the marked savings in heat, since the heat wasted is reduced by a very marked factor. Essentially, all of the heat is added at one spot, namely the superheating of the aniline prior to its entry into the DPA converter, and a maximum of this heat is reused in the other steps. The invention will be described in greater detail in conjunction with the drawing in which the single figure is a schematic flowsheet of the improved process.

Referring to the flowsheet, on which approximate temperatures for typical economical operation are given, aniline is taken from a supply tank 1 at room temperature. This flows into an aniline feed tank 2 where its temperature is raised by the hot recycled aniline from the separation process which will be described below and which, in the typical case illustrated, enters at about 220° C. This heat is transferred at high efficiency to the aniline in the feed tank which then flows out at about 210° C. into an aniline preheater 3 where it is preheated to about 390° C. and then flows into an aniline superheater 4 in which the aniline is superheated and vaporized. The temperature rise is effected by the burning of fuel, and this is the only point in the system at which heat is introduced from an outside source. Pressures in the aniline preheater as illustrated are around 130 p.s.i.; and in the superheater 4, somewhat over 100 p.s.i. This high pressure is necessary because the DPA converter 5, to which the superheated aniline flows, is operated normally at about 100 p.s.i. and, as there is considerable back pressure in the system, it is necessary to maintain a sufficient excess pressure in the superheater to assure flow. The aniline passes through the DPA converter 5, a minor portion being transformed into DPA and ammonia but the major portion of the aniline unfortunately passes through unreacted. The exit gases from the DPA converter 5 at about 470° C. are used as the source of heat for the aniline preheater, in which they are cooled to approximately 270° C. These gases, which contain the requisite superheat, then pass into an aniline stripper 6 in which aniline and other volatile constituents, such as ammonia, small amounts of water and other volatile by-products, remain in the vapor state, whereas DPA condenses with some aniline and is drawn off through a line marked "Crude DPA." The gases leaving the aniline stripper are at about 225° C., which is above the boiling point of aniline at the existing pressure. The stripper 6, which is of conventional design, incorporates reflux in order to avoid losses of DPA. The aniline vapors are then cooled in an aniline condenser 7 to about 220° C. A portion of the liquid aniline is refluxed and the remainder recycled to the ailine feed tank 2 as described above. The vapors, containing mostly ammonia, small amounts of water and other volatiles, pass off to an ammonia absorption system, which may be of conventional design and is not shown.

The flue gases from the aniline superheater 4 which may advantageously be at a temperature of the order of 550° C. are cooled to about 490° C., at which temperature they are introduced around the tubes of the DPA converter 5, serving as a heating medium to maintain reaction temperature. After passing through the DPA converter, they may be vented to the stack or a portion may be recycled, as is shown in dotted lines, through a recycling pipe 12 provided with a suitable valve 13.

DPA converters will not operate indefinitely because the reaction results in a certain amount of decomposition of aniline which deposits carbonaceous residues in the catalyst. After these residues have built up to a certain point, the efficiency of the catalyst drops, and it is necessary to regenerate it. As a result in a normal plant there is more than one DPA converter, and on the drawing a second DPA converter is shown at 8. Regeneration is effected by passing hot air through the catalyst tubes. This causes the carbonaceous impurities to burn and regenerates the catalyst. Cooling is effected by part of the flue gases to which, if desired, part or all of the flue gases from the DPA converter 5, which is on stream, may be added. This keeps the temperature during regeneration at a point sufficiently low so that the catalyst is not damaged by excessive heat. In the drawing there is shown an additional cooling means, namely a source of steam 9 which can be fed into the main flue gas cooling stream through a valved pipe 10, and, if desired, a portion may be introduced directly at various points in the DPA converter 8 through a valved pipe 11. The flue gases used in cooling the DPA converter 8, together with the combustion gases leaving the tubes, are vented to the stack. After regeneration is complete, air is shut off, as is steam, and the converter 8 can be cut into stream with the flow as shown in DPA converter 5. The piping and valves for connecting the converters successively to regeneration and on stream are conventional and for simplicity's sake are not shown on the drawing.

It will be noted that heat from an outside source, fuel, is introduced only at one point, namely the aniline superheater 4. The heat in the flue gases from this superheater is immediately utilized in the converters on stream and supplies the heat needed here. The remainder of the heat requirements for preheating the aniline for stripping the aniline from the crude DPA are supplied by utilizing the heat in the process gases leaving the DPA converter on stream, shown as converter 5 on the drawing. It will be noted that the maintenance of the aniline feed tank, stripper and condenser under a moderate pressure permits absorbing the heat at the desired temperature level in each case and also facilitates the discharge of liquids, crude DPA in the aniline stripper 6 and aniline in the aniline condenser 7, without requiring separate equipment.

The pressure of 30 p.s.i., which has been referred to above, is a typically satisfactory pressure. It is in no sense critical, and slightly lower or substantially higher pressures may be used. However, in general there is no advantage in operating under higher pressures in the aniline stripper and condenser. Of course, it is easier to operate with as low a pressure as is convenient and, therefore, in actual operation pressures not too far above the minimum will be employed. The 30 p.s.i. given in the description above represents a very satisfactory average pressure for this part of the system.

In the drawing the DPA converters are described as operating at 100 p.s.i. If the converters are operated at different pressures, for example 150 p.s.i., the other pressures and some temperatures are adjusted accordingly.

We claim:

1. In the conversion of aniline to diphenylamine including the steps of preheating and vaporizing aniline, passing resultant aniline vapor through a converter in direct contact with a deamination catalyst selected from the group consisting of the oxides of aluminum and titanium at a reaction temperature from above 400° to about 550° C.; passing a flow of heating gases through said converter in indirect contact with said catalyst, whereby said reaction temperature is maintained; condensing resultant reacted mixture; separating from resultant condensate the product diphenylamine; and recycling condensed unconverted aniline; the improvement which comprises: while maintaining superatmospheric pressure on all vapor flows containing aniline and diphenylamine, passing a flow of hot combustion gases from an external source and a flow of said vaporized aniline in indirect heat-exchange, whereby said combustion gases are partially-cooled and said aniline vapor becomes superheated at the operating pressure to a temperature equivalent to about 490° C. at 100 p.s.i.; passing said partially cooled combustion gases through said converter as said heating gases and then from the circuit; passing resultant superheated aniline vapor into reactive contact with said catalyst; maintaining (a) the superheated aniline and partially-cooled heating gas temperatures and (b) the flow rates of superheated aniline into and of heating gases through said converter at values such that said reaction temperature is maintained in said converter under a superatmospheric pressure of from about 100 to about 150 p.s.i., said temperature being sufficiently high that under the operating superatmospheric pressure all reactants in contact with said catalyst are maintained in the vapor phase; discharging so-reacted vapor mixture; passing the discharged vapor mixture and the aniline being preheated and vaporized in indirect heat exchange, whereby said reacted vapor mixture is partially cooled and said aniline is vaporized and preheated; then cooling said partially-cooled reacted vapor mixture to a temperature in the range below the boiling point of diphenylamine but above the boiling point of aniline under said superatmospheric pressure, whereby diphenylamine vapor condenses; collecting resultant liquid diphenylamine; then reducing the temperature of the residual vapors containing aniline to a temperature below the boiling point of aniline under said super-atmospheric pressure, whereby aniline condenses; collecting resultant liquid aniline; recycling collected aniline to said aniline preheater; pressure-relieving residual non-condensed volatiles and removing said non-condensed volatiles from the circuit.

2. A process according to claim 1 in which said diphenylamine condensation, said aniline condensation steps are each maintained under a lower superatmospheric pressure and said preheating and vaporizing steps are each maintained under a higher superatmospheric pressure than the superatmospheric pressure in the diphenylamine converter.

3. In the conversion of aniline to diphenylamine, including the steps of preheating and vaporizing aniline, passing resultant aniline vapor under super-atmospheric pressure through a converter in direct contact with a deamination catalyst selected from the group consisting of the oxides of aluminum and titanium at an elevated reaction temperature; passing a flow of heating gases through said converter in indirect contact with said catalyst, whereby said reaction temperature is maintained; condensing resultant reacted mixture; separating from resultant condensate the product diphenylamine and recycling condensed unconverted aniline; the improvement which comprises: passing a flow of said vaporized aniline at a temperature and pressure equivalent to about 390° C. at about 130 p.s.i. and a flow of hot combustion gases at a temperature above 550° C. from an external source in indirect heat-exchange, whereby said combustion gases are partially cooled to about 550° C. and said aniline vapor becomes superheated to a temperature at the operating pressure equivalent to about 490° C. at about 100 p.s.i.; passing said partially-cooled combustion gases through said converter as said heating gases and then from the circuit; passing resultant superheated aniline vapor into reactive contact with said catalyst; maintaining a back pressure of about 100 p.s.i. on said converter; maintaining the flows of aniline vapor and of heating gases through the converter at rates such that all material passed through said converter in contact with said catalyst is maintained in the vapor phase and discharged at a temperature and pressure equivalent to about 470° C., at about 100 p.s.i.g.; passing the discharged vapor mixture and the aniline being preheated in indirect heat exchange, whereby the reacted vapor mixture is partially cooled to a temperature of bout 270° C., and said aniline is vaporized and preheated to said temperature and pressure equivalent to about 390° at 100 p.s.i.g. at which it is passed to said superheating step; then cooling said reacted vapor mixture from about 270° C., to about 225° C., to about 250° C., whereby diphenylamine condenses; collecting resultant liquid diphenylamine; then reducing the temperature of the residual vapors containing aniline from said about 225° to about 250° C. to a temperature of about 220° C., whereby aniline condenses; collecting resultant liquid aniline; recycling collected aniline to said aniline preheater; pressure-relieving residual non-condensed volatiles and removing said non-condensed volatiles from the circuit.

4. A process according to claim 3 in which the pressure during each of said diphenylamine and said aniline condensation steps is of the order of 30 p.s.i. and the pressure during each of the preheating, vaporizing and superheating steps is from about 100 to about 130 p.s.i.

References Cited in the file of this patent

UNITED STATES PATENTS

| | | |
|---|---|---|
| 1,840,576 | Frei | Jan. 12, 1932 |
| 2,098,039 | Hill et al. | Nov. 2, 1937 |
| 2,120,969 | Acken | June 21, 1938 |
| 2,514,430 | Webb et al. | July 11, 1950 |

FOREIGN PATENTS

| | | |
|---|---|---|
| 752,859 | Great Britain | July 18, 1956 |